United States Patent
Lee

(10) Patent No.: US 10,282,853 B2
(45) Date of Patent: May 7, 2019

(54) METHOD FOR TRACKING OBJECT IN VIDEO IN REAL TIME IN CONSIDERATION OF BOTH COLOR AND SHAPE AND APPARATUS THEREFOR

(71) Applicant: ELECTRONICS AND TELECOMMUNICATIONS RESEARCH INSTITUTE, Daejeon (KR)

(72) Inventor: Jae-Yeong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 17 days.

(21) Appl. No.: 15/817,432

(22) Filed: Nov. 20, 2017

(65) Prior Publication Data

US 2018/0268559 A1    Sep. 20, 2018

(30) Foreign Application Priority Data

Mar. 16, 2017  (KR) .......................... 10-2017-0033140

(51) Int. Cl.
*G06K 9/00*    (2006.01)
*G06T 7/246*   (2017.01)
(Continued)

(52) U.S. Cl.
CPC ............... *G06T 7/251* (2017.01); *G06T 5/40* (2013.01); *G06T 7/248* (2017.01); *G06T 7/60* (2013.01);
(Continued)

(58) Field of Classification Search
CPC . G06T 2207/10024; G06T 2207/20076; G06T 7/90; G06T 2207/10016;
(Continued)

(56) References Cited

U.S. PATENT DOCUMENTS 7,068,814 B2    6/2006 You et al.
8,130,774 B2    3/2012 Kim et al.
(Continued)

FOREIGN PATENT DOCUMENTS

KR    1999-0060993    7/1999
KR    2002-0032765    5/2002
(Continued)

OTHER PUBLICATIONS

Dorin Comaniciu et al., "Kernel-Based Object Tracking", IEEE Transactions on Pattern Analysis and Machine Intelligence, vol. 25, No. 5, May 2003, pp. 564-577.
(Continued)

*Primary Examiner* — Tom Y Lu
(74) *Attorney, Agent, or Firm* — Kile Park Reed & Houtteman PLLC

(57) ABSTRACT

Disclosed herein are a method for tracking object in video in real time in consideration of both color and shape and an apparatus for the same. The apparatus may generate at least one of a correlation filter model and a color probability density model based on an input image, determine an initial position and an initial size of a target to be tracked based on a correlation filter response value calculated by applying the correlation filter model to the input image, calculate a joint probability based on the correlation filter response value and a color object probability that is calculated based on the color probability density model, and update an object model corresponding to the target to be tracked based on a final position and a final size of the target to be tracked, which are determined by applying the joint probability to the initial position and the initial size.

20 Claims, 10 Drawing Sheets

(51) Int. Cl.
*G06T 5/40* (2006.01)
*G06T 7/90* (2017.01)
*G06T 7/73* (2017.01)
*G06T 7/60* (2017.01)

(52) U.S. Cl.
CPC .................. *G06T 7/74* (2017.01); *G06T 7/75* (2017.01); *G06T 7/90* (2017.01); *G06T 2207/10016* (2013.01); *G06T 2207/10024* (2013.01); *G06T 2207/20076* (2013.01); *G06T 2207/20104* (2013.01)

(58) Field of Classification Search
CPC . G06T 2207/20104; G06T 5/40; G06T 7/248; G06T 7/251; G06T 7/60; G06T 7/74; G06T 7/75; G06T 7/246; G06T 7/277
See application file for complete search history.

(56) References Cited

U.S. PATENT DOCUMENTS

| | | | |
|---|---|---|---|
| 9,129,397 B2 | 9/2015 | Choi et al. | |
| 2006/0285723 A1* | 12/2006 | Morellas | G06K 9/00369 382/103 |
| 2013/0287250 A1 | 10/2013 | Lee | |
| 2014/0363143 A1* | 12/2014 | Dharssi | G06K 9/00765 386/282 |
| 2017/0134631 A1* | 5/2017 | Zhao | G05D 1/12 |
| 2017/0300778 A1* | 10/2017 | Sato | H04N 5/2226 |

FOREIGN PATENT DOCUMENTS

| | | |
|---|---|---|
| KR | 10-2013-0121202 | 11/2013 |
| KR | 10-1439037 | 9/2014 |

OTHER PUBLICATIONS

Jae-Yeong Lee et al., "Visual Tracking by Partition-based Histogram Backprojection and Maximum Support Criteria", Proceedings of the IEEE International Conference on Robotics and Biomimetics (ROBIO), Dec. 7-11, 2011; pp. 2860-2865, Phuket Island, Thailand.

João F. Henriques et al., "High-Speed Tracking with Kernelized Correlation Filters", IEEE Transactions on Pattern Analysis and Machine Intelligence, 2015, pp. 1-14.

Visual Object Tracking, VOT2015 Challenge Dataset, ICCV2015, Santiago, Chile, http://www.votchallenge.net/vot2015/dataset.html.

* cited by examiner

| METHOD | TRACKING ACCURACY | TOTAL NUMBER OF FAILURES |
|---|---|---|
| SumShift | 0.48 | 81 |
| KCF | 0.48 | 134 |
| TRACKING METHOD OF THE PRESENT INVENTION | 0.53 | 77 |

FIG. 8

METHOD FOR TRACKING OBJECT IN VIDEO IN REAL TIME IN CONSIDERATION OF BOTH COLOR AND SHAPE AND APPARATUS THEREFOR

CROSS REFERENCE TO RELATED APPLICATION

This application claims the benefit of Korean Patent Application No. 10-2017-0033140, filed Mar. 16, 2017, which is hereby incorporated by reference in its entirety into this application.

BACKGROUND OF THE INVENTION

1. Technical Field

The present invention relates generally to technology for tracking a specific region or object in a video, and more particularly to a method and apparatus for tracking target object or region in consecutive video frames in real time in consideration of both color and shape, which may improve the accuracy and stability of object tracking while guaranteeing real-time calculation by combining the response value of a correlation filter with color probability information.

2. Description of the Related Art

Visual object tracking technology is technology for keeping sight of a specific region or object in input video images or live camera images. Generally, the initial position of a target to be tracked is given as a region set by a user or a region detected using an object recognition algorithm. Such visual object tracking technology plays a crucial role for successful implementation various kinds of vision applications such as visual surveillance, human robot interaction, tracking a subject from a broadcast drone, tracking a player for sports game analysis, and the like.

Here, when such visual object tracking technology is applied to real application, it is most important to guarantee both real-time operation and the accuracy of tracking at the same time in order to keep track of a moving object. However, most conventional visual object tracking technology is problematic in that real-time tracking is not guaranteed because of the use of complicated algorithms for improving the accuracy of tracking.

As a representative method of enabling real-time tracking, among conventional image tracking methods, there is a Mean-Shift (D. Comaniciu, V. Ramesh, and P. Meer, Kernel-based object tracking, TPAMI 2003) tracking method using color information. The Mean-Shift method is a method for tracking an object using the similarity of color histograms. More specifically, the probability distribution of colors included in a target object is acquired from an image and is then back-projected to the current input image (histogram back-projection), whereby an object probability corresponding to each pixel color is calculated. Then, a local mass center of probability density in search radius in the image is found, whereby the target object is tracked.

A tracking method using the color histogram of an object, such as the Mean-Shift method, is advantageous in that it may be simply and quickly implemented and in that it is robust to changes in the shape of the object. However, because it discards information about the shape of the object, it may lose track of the object when the background includes a color that is similar to the color of the object or when the size of the object changes. These problems are common to color-based tracking methods, rather than being confined to the Mean-Shift method.

The Sum-Shift (Jae-Yeong Lee and Wonpil Yu, Visual Tracking by Partition-based Histogram Backprojection and Maximum Support Criteria, IEEE RoBio 2011) method, which has recently been proposed as a method for compensating for the defects of the Mean-Shift method, is configured to find a region in which the sum of probability densities is highest, rather than a local mass center. The Sum-Shift method considerably improves the accuracy of tracking while supporting real-time operation. However, because the Sum-Shift method also uses the color histogram of a target, it has a similar performance limitation with the color-based tracking methods.

As another conventional method for real-time tracking, there is a Kernelized Correlation Filter (KCF)(J. F. Henriques, R. Caseiro, P. Martins, J. Batista, High-Speed Tracking with Kernelized Correlation Filters) method. The KCF method tracks an object by learning a correlation filter. More specifically, a filter may be learned such that the distribution of correlation filtering results for the current input image follows a kernel function, such as a Gaussian function. Here, calculation for filter learning is performed quickly using the Fast Fourier Transform (FFT), the learned correlation filter is applied to the input image frame, and a point at which the filtering result has the maximum value is found, whereby an object may be tracked. Because of the fast operation speed (200 to 300 fps) and the relatively high accuracy of tracking, the KCF is widely used as a base tracker of recent state-of-the-art tracking methods, such as the Discriminative Scale Space Tracker (DSST), the Scale Adaptive with Multiple Features (SAMF), and the like.

The KCF method maintains the shape information of the object through the learned correlation filter, so it has a high discrimination power against the background change and can track the size change of the object. However, there is still a performance problem in that it is relatively weak in shape change and rotation change of the object.

Consequently, the method using a color histogram is robust to changes in the shape of a target, but is problematic in that it may not correctly distinguish the target from the background and in that changes in the size of the target may not be tracked. On the other hand, the method based on a correlation filter may correctly distinguish a target from the background and track changes in the size of the target, but the accuracy of tracking may decrease when the shape of the target changes.

DOCUMENTS OF RELATED ART (Patent Document 1) D. Comaniciu, V. Ramesh, and P. Meer, Kernel-based object tracking, TPAMI 2003

(Patent Document 2) Jae-Yeong Lee and Wonpil Yu, Visual Tracking by Partition-based Histogram Backprojection and Maximum Support Criteria, IEEE RoBio 2011

(Patent Document 3) J. F. Henriques, R. Caseiro, P. Martins, J. Batista, High-Speed Tracking with Kernelized Correlation Filters

SUMMARY OF THE INVENTION

An object of the present invention is to enable the implementation of fast tracking even in a low computational power environment, such as an embedded system or the like.

Another object of the present invention is to provide a method for providing good tracking performance regardless of shading, rotation, and changes in the size and shape of a target to be tracked.

A further object of the present invention is to track an object by combining the color information and the shape information thereof, which are complementary to each other, and to thereby improve object-tracking performance in an image.

In order to accomplish the above objects, an apparatus for tracking object in video in real time according to the present invention includes a generation unit for generating at least one of a correlation filter model, in which a shape of a target to be tracked is considered, and a color probability density model, in which a color distribution of the target to be tracked is considered, based on an input image; a determination unit for determining an initial position and an initial size of the target to be tracked based on a correlation filter response value that is calculated by applying the correlation filter model to the input image; a calculation unit for calculating a joint probability of the target based on the correlation filter response value and a color object probability that is calculated based on the color probability density model; and an update unit for determining a final position and a final size of the target to be tracked by applying the joint probability to the initial position and the initial size and for updating an object model corresponding to the target to be tracked based on the final position and the final size.

Here, the calculation unit may calculate the joint probability by calculating a weighted average of the color object probability and the correlation filter response value for each of the image pixels in the input image.

Here, the update unit may determine, based on the initial position, a place at which a probability density of the joint probability reaches a maximum to be the final position, and may determine the initial size to be the final size.

Here, the determination unit may determine a place corresponding to any one pixel at which the correlation filter response value reaches a maximum, among the image pixels, to be the initial position. And the determination unit may evaluate the correlation filter response repeatedly on various image scales and determine the initial size of the target in the current image frame as the product of the previous size of the target (final size of the target in the previous image frame) and a scale of the input image that gives a maximum filter response. Hereinafter scale is defined as the ratio of the size of the resized image to the size of the original image. For example, scale 2 means double size and scale 0.5 means half size.

Here, the calculation unit may calculate the color object probability for each of the image pixels by back-projecting the color probability density model of target object to the input image.

Here, the generation unit may acquire region information about the target to be tracked, and may generate at least one of the correlation filter model and the color probability density model for an object region corresponding to the region information in the input image.

Here, the region information may be acquired based on at least one of an object detection module and settings made by a user.

Here, the generation unit may generate at least one of the correlation filter model and the color probability density model in at least one of a case in which the target to be tracked is first set and a case in which the target to be tracked is reset.

Here, the generation unit may generate the correlation filter model such that the result of a correlation filter operation performed for the object region is a kernel function.

Here, the generation unit may generate the color probability density model by dividing a value of a color histogram corresponding to the object region by a total number of pixels included in the object region.

Here, the update unit may update the object model so as to match a weighted average of a previous object model corresponding to the target to be tracked and a new object model created based on the final position and the final size.

Also, a method for tracking object in video in real time, which uses a real-time visual object tracking apparatus that considers both color and shape, according to an embodiment of the present invention includes generating, by the real-time visual object tracking apparatus, at least one of a correlation filter model, in which a shape of a target to be tracked is considered, and a color probability density model, in which a color distribution of the target to be tracked is considered, based on an input image; determining, by the real-time visual object tracking apparatus, an initial position and an initial size of the target to be tracked based on a correlation filter response value that is calculated by applying the correlation filter model to the input image; calculating, by the real-time visual object tracking apparatus, a joint probability based on the correlation filter response value and a color object probability that is calculated based on the color probability density model; and determining, by the real-time visual object tracking apparatus, a final position and a final size of the target to be tracked by applying the joint probability to the initial position and the initial size, and updating, by the real-time visual object tracking apparatus, an object model corresponding to the target to be tracked based on the final position and the final size.

Here, calculating the joint probability may be configured to calculate a weighted average of the color object probability and the correlation filter response value for each of the image pixels.

Here, updating the object model may include, based on the initial position, determining a place at which a probability density of the joint probability reaches a maximum to be the final position; and determining the initial size to be the final size.

Here, determining the final position and the final size may include determining a place corresponding to any one pixel at which the correlation filter response value reaches a maximum, among the image pixels, to be the initial position; and determining a result of multiplying a previous size of the target to be tracked in a frame preceding the input image by a scale of the input imagethat gives a maximum filter response, to the initial size.

Here, calculating the joint probability may be configured to calculate the color object probability for each of the image pixels by back-projecting the color probability density model to the input image.

Here, generating at least one of the correlation filter model and the color probability density model may be configured to acquire region information corresponding to the target to be tracked and to generate at least one of the correlation filter model and the color probability density model for an object region corresponding to the region information in the input image.

Here, the region information may be acquired based on at least one of an object detection module and settings made by a user.

Here, generating at least one of the correlation filter model and the color probability density model may include generating the correlation filter model such that the result of a correlation filter operation performed for the object region is a kernel function as the correlation filter model; and generating the color probability density model by dividing a value of a color histogram corresponding to the object region by a total number of pixels included in the object region.

Here, updating the object model may be configured to update the object model so as to match a weighted average of a previous object model corresponding to the target to be tracked and a new object model created based on the final position and the final size.

BRIEF DESCRIPTION OF THE DRAWINGS

The above and other objects, features and advantages of the present invention will be more clearly understood from the following detailed description taken in conjunction with the accompanying drawings, in which:

FIG. 8 is a view that shows the result of comparison of the performance of a real-time visual object tracking method according to the present invention with the performance of conventional visual object tracking methods;

DESCRIPTION OF THE PREFERRED EMBODIMENTS

Figure 1:
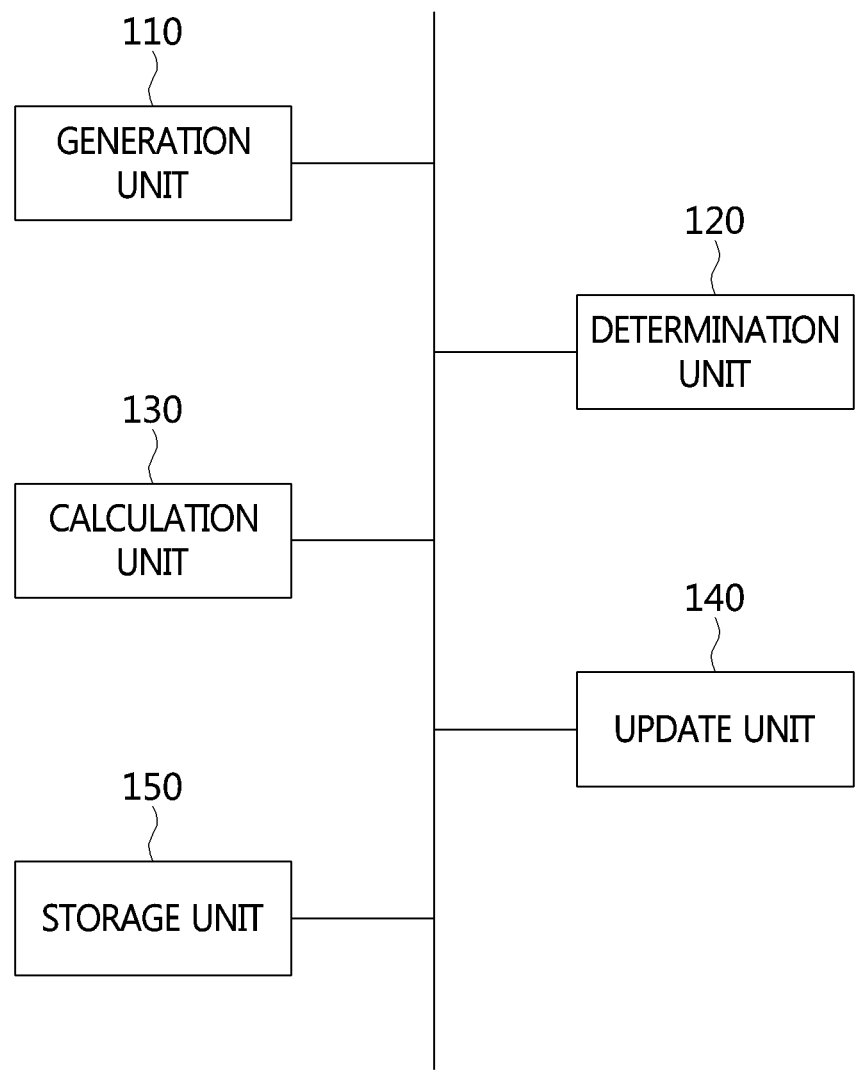
FIG. 1 is a block diagram that shows an apparatus for tracking object in video in real time in consideration of both color and shape according to an embodiment of the present invention.
Figure 2:
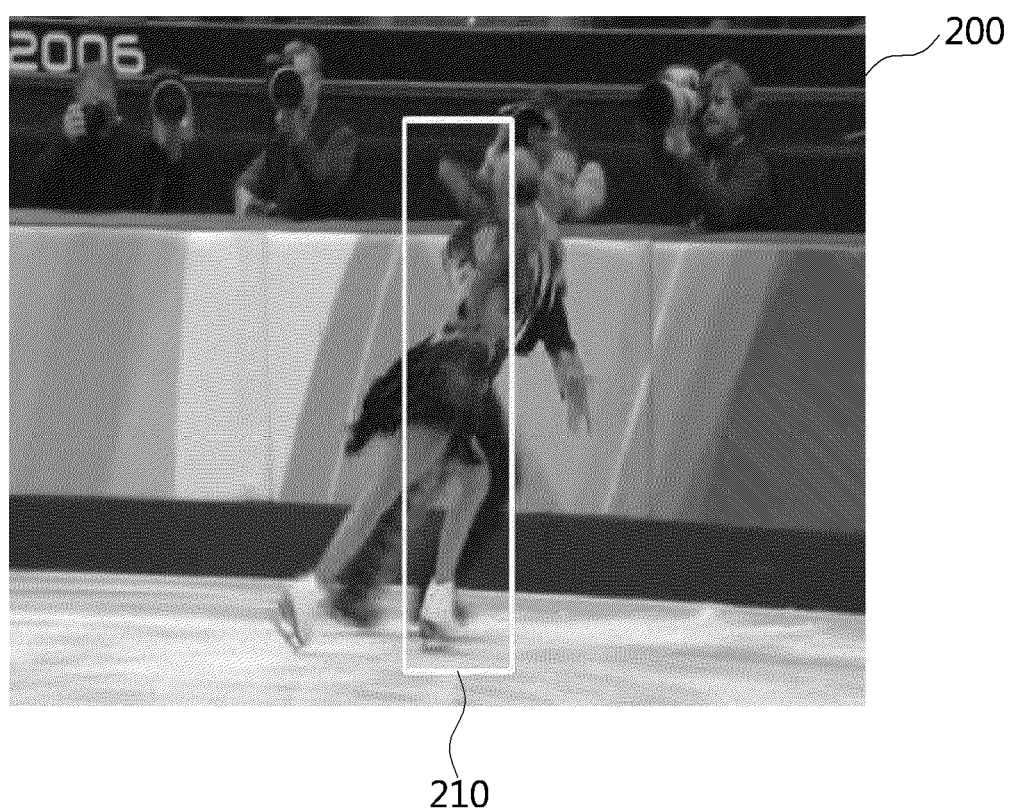
FIGS. 2 to 7 are views that schematically show the process of tracking object in video in real time according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a block diagram that shows an apparatus for tracking object in video in real time in consideration of both color and shape according to an embodiment of the present invention.

Referring to FIG. 1, the apparatus for tracking object in video in real time according to an embodiment of the present invention includes a generation unit 110, a determination unit 120, a calculation unit 130, an update unit 140, and a storage unit 150.

The generation unit 110 generates at least one of a correlation filter model, in which the shape of a target to be tracked is considered, and a color probability density model, in which the color of the target to be tracked is considered, based on an input image.

Here, the input image may be received through a separate image input module for receiving an image. For example, the image input module may receive an image for which the visual object tracking process is to be performed in real time. Here, the input image may be an image file, a video file, or a camera image signal. However, the format of the input image and the input interface are not limited to specific formats or interfaces.

Here, both the correlation filter model and the color probability density model correspond to an object model for the target to be tracked, and may become an object model for tracking the target.

Here, region information about the target to be tracked is acquired, and at least one of a correlation filter model and a color probability density model may be generated for an object region corresponding to the region information in the entire region of the input image.

Here, the region information may be acquired based on at least one of an object detection module and settings made by a user. For example, a user may input the region information by setting the position, the size, the border, and the like of the target to be tracked on the screen of the input image. Alternatively, the region information for the target to be tracked may be acquired by detecting the target to be tracked in the input image using the object detection module.

Here, when the target to be tracked is first set or when the target to be tracked is reset, at least one of a correlation filter model and a color probability density model may be generated.

Here, the correlation filter model may correspond to a filter that outputs a kernel function as the result of the correlation filter operation performed for the input image. That is, a filter satisfying the condition in which the result of the correlation filter operation performed for the object region is a kernel function may be generated as the correlation filter model.

Here, the kernel function is a function that is symmetric about the origin and outputs a value that is equal to or greater than 0 (a non-negative value) for every input. Also, the integration of the function becomes 1. Gaussian, Epanechnikov, and uniform functions are representative examples of such kernel functions.

That is, the correlation filter model that the present invention intends to generate may be a correlation filter satisfying the condition in which the result of a correlation filter operation performed for the input image is a kernel function that has a peak at the position of a target to be tracked and has values that decrease the farther a position is from the position of the target to be tracked.

For example, if the region for the target to be tracked in the input image is x and if the kernel function is y, the correlation filter $f$ may be calculated as shown in Equation (1):

$$\hat{f} = \frac{\hat{x}^* \odot y}{\hat{x}^* \odot \hat{x} + \lambda} \quad (1)$$

where $\hat{x}$ denotes the Discrete Fourier Transform for x, the superscript * denotes a complex-conjugate, $\odot$ denotes element-wise multiplication, the division is element-wise division, and $\lambda$ denotes a regulation parameter for limiting the norm of the function $f$.

Here, the color probability density model may be a probability density function modeled for the distribution of colors included in the target to be tracked.

Here, the color probability density model may be generated by dividing the value of a color histogram for the object region by the total number of pixels included in the object region. The easiest way to acquire the color probability density from the input image may be the use of a normalized color histogram.

Here, the color histogram may be formed by dividing the ranges of colors into sections and counting pixels corresponding to each section. After a color histogram for image pixels included in the target to be tracked in the input image is acquired, the color probability density may be calculated by dividing the value of the color histogram by the total number of object pixels.

Such a color probability density model may be modeled as a single histogram for the entire object, as in the Mean-Shift method for performing image tracking using color information, or may be modeled as histograms for segmented regions included in the object, as in the Sum-Shift method, but the implementation thereof is not limited to these examples.

The determination unit 120 determines the initial position and the initial size of the target to be tracked based on a correlation filter response value that is calculated by applying the correlation filter model to the input image.

Here, a place corresponding to any one pixel having the maximum correlation filter response value, among image pixels, is determined to be the initial position, and the result of multiplying the size of the target to be tracked in the frame preceding the input image by the multiplicative inverse of the scale of the input image, which is acquired when the correlation filter response value for the input image reaches the maximum, may be determined to be the initial size.

That is, the correlation filter response value may be calculated for each of the image pixels within the input image. For example, if the correlation filter model is $f$ and if the input image is I, the correlation filter response value $R(x, y)$ at the pixel $(x, y)$ may be calculated as shown in Equation (2):

$$R(x,y)=\Sigma_i f(x_i-x, y_i-y) I(x_i, y_i) \quad (2)$$

Here, it is desirable for the initial position of the target to be set to the place at which the correlation filter response value $R(x, y)$ reaches the maximum.

Also, the initial size of the target to be tracked may be set in such a way that, after a correlation filter response value is calculated while changing the scale of the input image, the scale of the input image when the calculated correlation filter response value reaches the maximum is selected, and the product of the multiplicative inverse of the corresponding scale and the size of the target in the frame preceding the input image is set as the initial size of the target to be tracked.

For example, if the correlation filter response value reaches the maximum when the image of the target to be tracked is scaled up 1.1 times and if the size of the target to be tracked in the frame immediately preceding the input image is s, the initial size of the target to be tracked in the current image frame may be set to s/1.1.

The calculation unit 130 calculates a joint probability based on the correlation filter response value and a color object probability, which is calculated based on the color probability density model.

Here, the joint probability may be calculated by calculating the weighted average of a color object probability and a correlation filter response value for each of the image pixels.

For example, using the current object model corresponding to the target to be tracked, the correlation filter response value calculated for the pixel $(x, y)$ may be assumed to be $R(x, y)$, and the color probability density value calculated for the color of the pixel $(x, y)$ may be assumed to be $H(x, y)$. Here, $H(x, y)$ may represent the color object probability based on the color information of the target to be tracked, and $R(x, y)$ may represent the probability based on information about the shape of an object. The joint probability $p(x, y)$, which is a combination of the two complementary characteristics, may be calculated using various methods, but may be desirably calculated as the weighted average of two probabilities, as shown in Equation (3):

$$p(x,y)=w*H(x,y)+(1-w)*R(x,y) \quad (3)$$

where w is a constant that satisfies $0 \leq w \leq 1$, and is a parameter that may be freely adjusted according to the applications.

Here, the color object probability for each of the image pixels in the input image may be calculated by back-projecting the color probability density model to the input image.

The update unit 140 determines the final position and the final size of the target to be tracked by applying the joint probability to the initial position and the initial size, and updates the object model corresponding to the target to be tracked based on the final position and the final size.

Here, based on the initial position, the place at which the probability density of the joint probability reaches the maximum is determined to be the final position, and the initial size may be determined to be the final size.

Here, the position at which the probability density reaches the maximum may be calculated using various methods, and the method is not limited to any specific method.

For example, the place corresponding to the local peak of the joint probability distribution may be found using the Mean-Shift method, or the place at which the local sum of joint probabilities reaches the maximum may be found using the Sum-Shift method. Here, when the place at which the local sum of probabilities reaches the maximum is determined to be the final position, as in the Sum-Shift method, the accuracy of image tracking may be improved more than when using the Mean-Shift method.

Also, the final size of the target to be tracked may be calculated again using the joint probability. However, because it is more desirable to determine the size of the target to be tracked based on the shape information, rather than on the probability acquired from the color information, the initial size, determined based on the correlation filter model, may be used as the final size without change.

Here, the object model may be updated so as to match the weighted average of the previous object model corresponding to the target to be tracked and a new object model created based on the final position and the final size.

That is, after an object model is newly generated from the image region that is selected based on the finally determined position and size of the target to be tracked in the current input image, the object model may be updated using the weighted average of the object model and the previously maintained object model. For example, assuming that the previous object model is $M^{t-1}$, that the newly generated object model is M, and that the updated object model is $M^t$, $M^t$ may be calculated as shown in Equation (4):

$$M^t=(1-\mu)M^{t-1}+\mu M \quad (4)$$

where μ is a parameter for adjusting the model update speed, and may be set to any value between 0 and 1, but generally, it is advantageous to use a small value, for example, about 0.01.

Here, because the object model according to an embodiment of the present invention consists of two models, which are the correlation filter model and the color probability density model, the object model update process using Equation (4) may be performed for each of the correlation filter model and the color probability density model. In this case, the update speed parameter μ may be set to different values for the respective models.

The storage unit 150 stores various kinds of information generated in the apparatus for tracking object in video in real time according to an embodiment of the present invention.

According to an embodiment, the storage unit 150 may be separate from the apparatus for tracking object in video in real time, and may support a function for real-time visual object tracking. In this case, the storage unit 150 may operate as a separate mass storage, and may include a control function for performing operations.

Meanwhile, the apparatus for tracking object in video in real time may store information therein by including memory therein. In an embodiment, the memory is a computer-readable recording medium. In an embodiment, the memory may be a volatile memory unit, and in another embodiment, the memory may be a non-volatile memory unit. In an embodiment, the storage device is a computer-readable recording medium. In different embodiments, the storage device may include, for example, a hard disk device, an optical disk device, or any other mass storage device.

Through the above-described apparatus for tracking object in video in real time, high-speed tracking may be implemented even in a low computational power environment, such as an embedded system or the like.

Also, a method that achieves great tracking performance regardless of shading, rotation, and changes in the size and shape of a target to be tracked may be provided, and the performance of tracking an object in an image may be improved by tracking the object using a combination of the color information and the shape information thereof.

FIGS. 2 to 7 are views that schematically show the process of tracking object in video in real time according to an embodiment of the present invention.

Referring to FIGS. 2 to 7, in the real-time visual object tracking process according to an embodiment of the present invention, an image is tracked in real time by combining the Kernelized Correlation Filter (KCF) method with the Sum-Shift tracking method.

Figure 3:
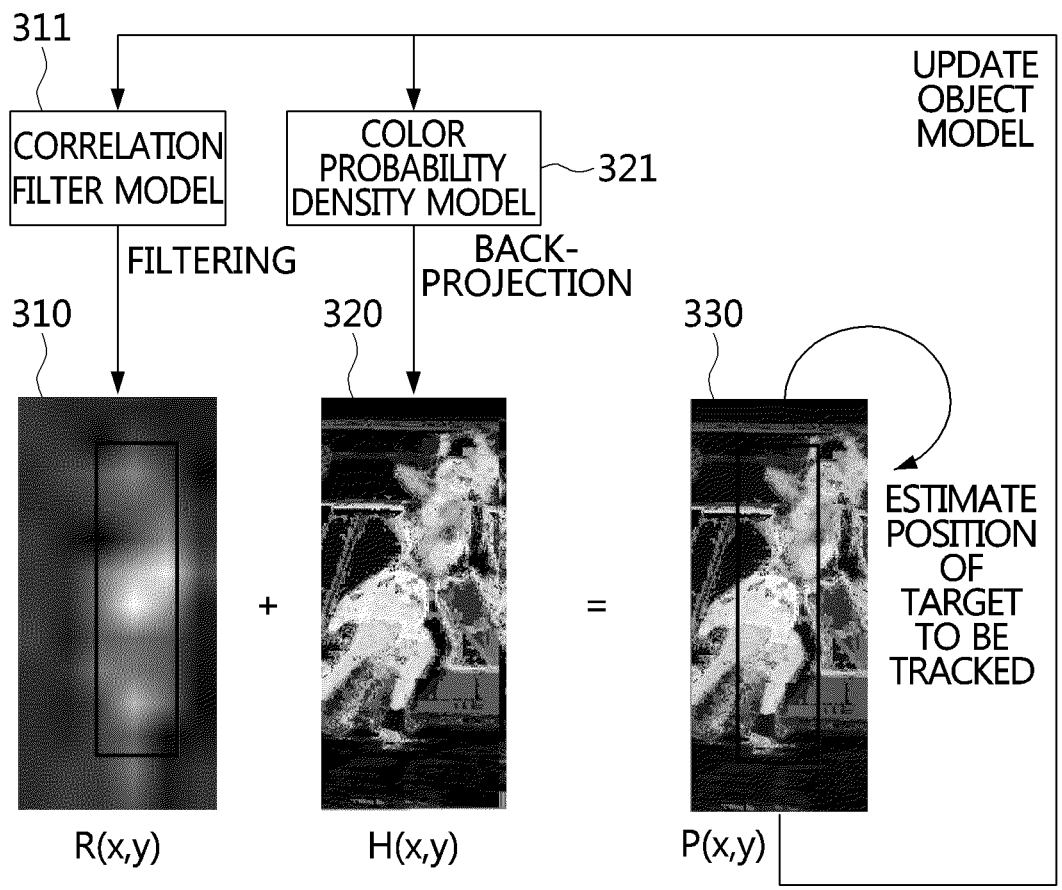

Here, R(x, y), illustrated in FIG. 3, represents the result of correlation filtering 310 and a correlation filter response value, calculated for an object region corresponding to region information 210 by applying the current correlation filter model 311 to the input image 200. Also, H(x, y) may represent a color object probability acquired by back-projecting the color probability density model 321, represented as a color histogram, to the input image 200 (histogram back-projection).

That is, R(x, y) may be the result of image tracking using the KCF method, and H(x, y) may be the result of image tracking using the Sum-Shift tracking method.

Here, the real-time visual object tracking method according to the present invention may track an image in real time based on a joint probability p(x, y), acquired by combining R(x, y) with H(x, y), and the resultant value may be provided as the final tracking result 330.

Also, the real-time visual object tracking method according to the present invention may use the final tracking result 330 in order to update the object model corresponding to the target to be tracked, that is, in order to update the correlation filter model and the color probability density model of the current input image.

Figure 4:
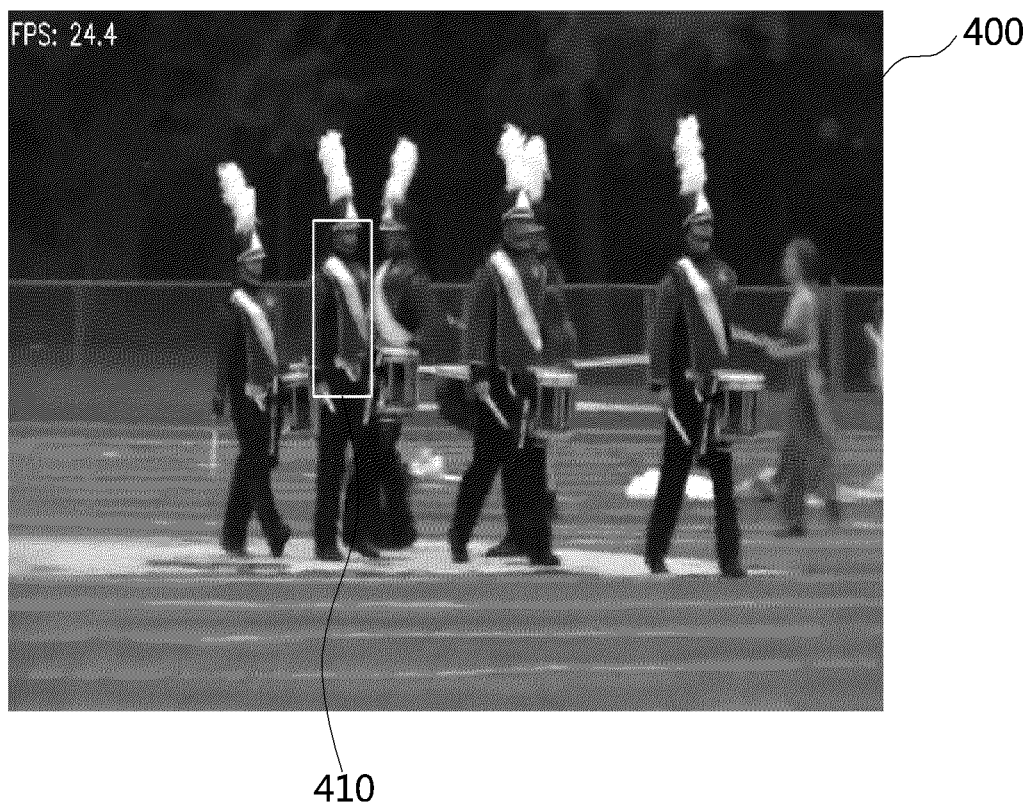
Figure 5:
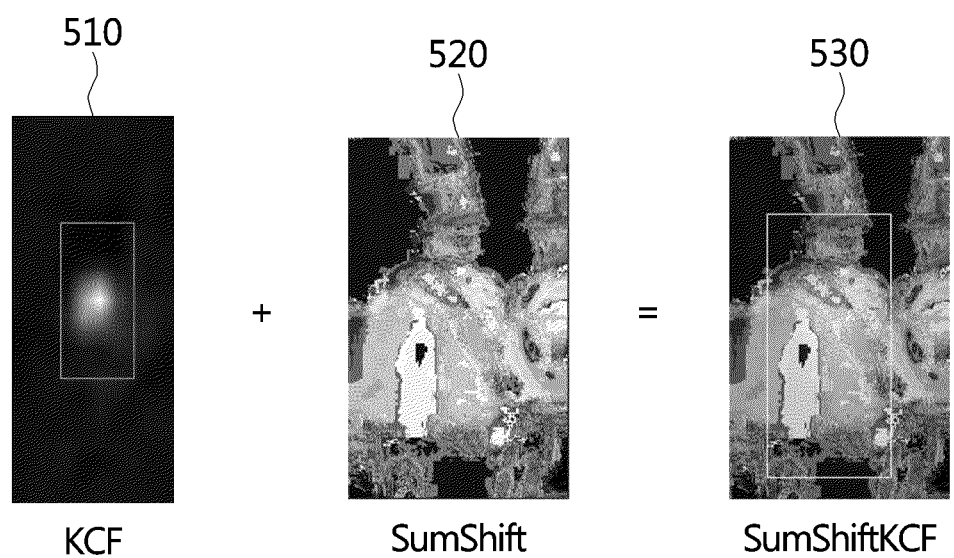

Through the above-described method, the result 510 of tracking using the KCF method and the result 520 of tracking using the Sum-Shift method are respectively calculated for the region information 410 illustrated in FIG. 4 and are then combined, whereby the SumShiftKCF tracking result 530 according to the present invention may be generated, as shown in FIG. 5.

Figure 6:
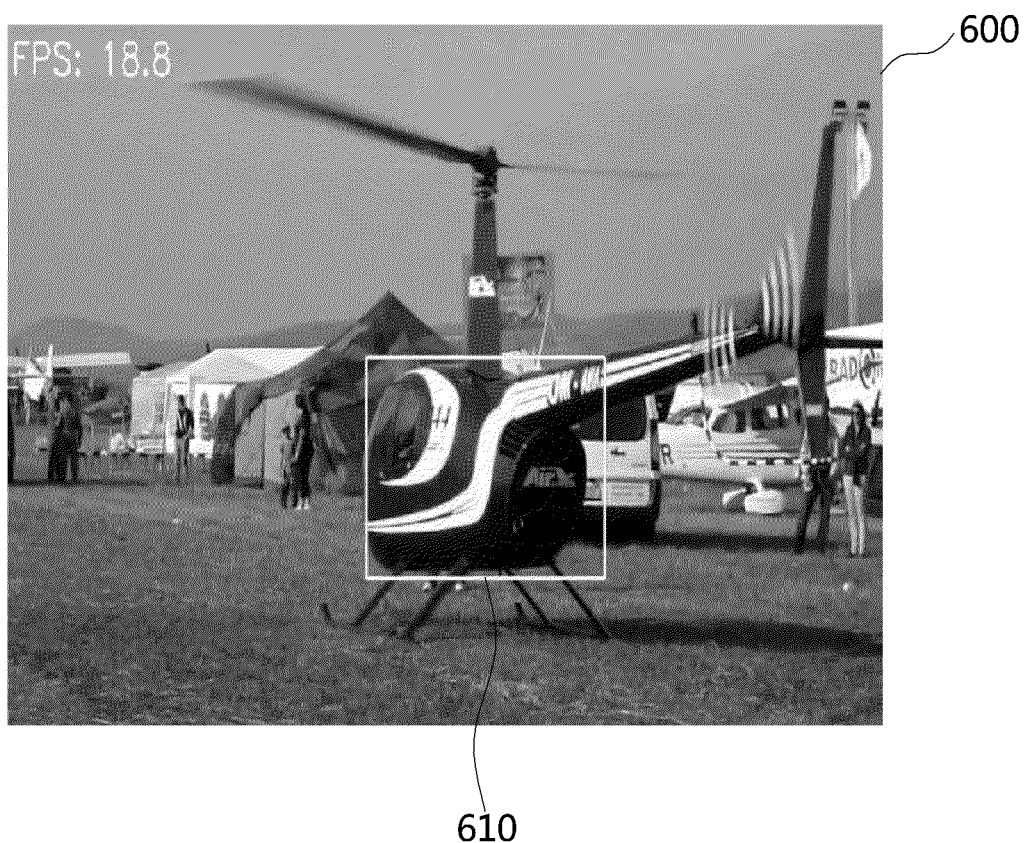
Figure 7:
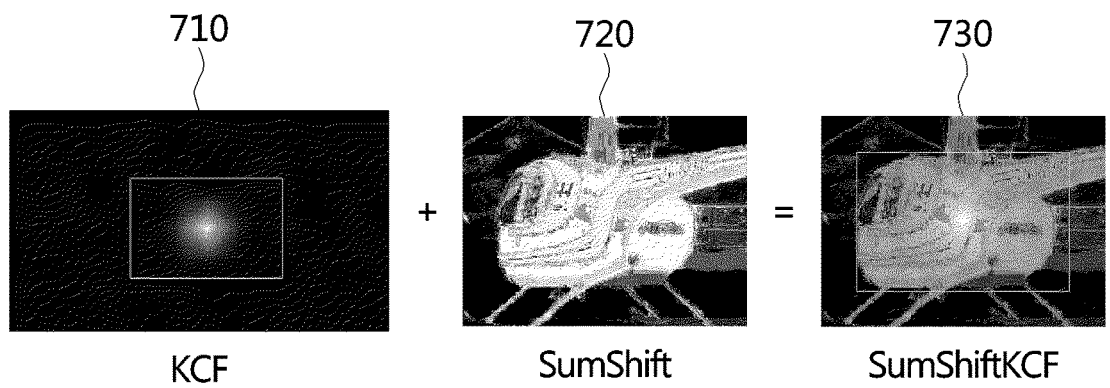

Also, for the input image illustrated in FIG. 6, real-time visual object tracking may be performed as shown in FIG. 7.

FIG. 8 is a view that shows a result of comparison of the performance of a real-time visual object tracking method according to the present invention and that of conventional visual object tracking methods.

Referring to FIG. 8, in order to verify the effect of the real-time visual object tracking method according to the present invention, the performance of visual object tracking using the Sum-Shift method, the performance of visual object tracking using the KCF method, and the performance of the visual object tracking method according to the present invention are evaluated using the dataset that was used in the Visual Object Tracking (VOT) 2016 Challenge, which is a representative international contest in the field of image tracking.

Here, the average tracking accuracy and the total number of tracking failures for 60 test videos are used as performance indices, as in the VOT Challenge.

Here, in the process according to an embodiment of the present invention, the KCF method is used for the calculation of the correlation filter, and the Sum-Shift method is used for the calculation of the color probability density.

Referring to FIG. 8, the performance experiment result shows that the tracking accuracy and the tracking stability (based on the total number of failures) are greatly improved when the real-time visual object tracking method according to the present invention is applied, compared to when the conventional KCF method or the Sum-Shift method is used.

Here, although the embodiment of FIG. 8 uses a KCF tracker as an example of the correlation filter tracker and uses a Sum-Shift tracker as an example of the color probability model tracker, the implementation of modules for the correlation filter tracker and the color probability model tracker according to the present invention are not limited to specific methods.

Figure 9:
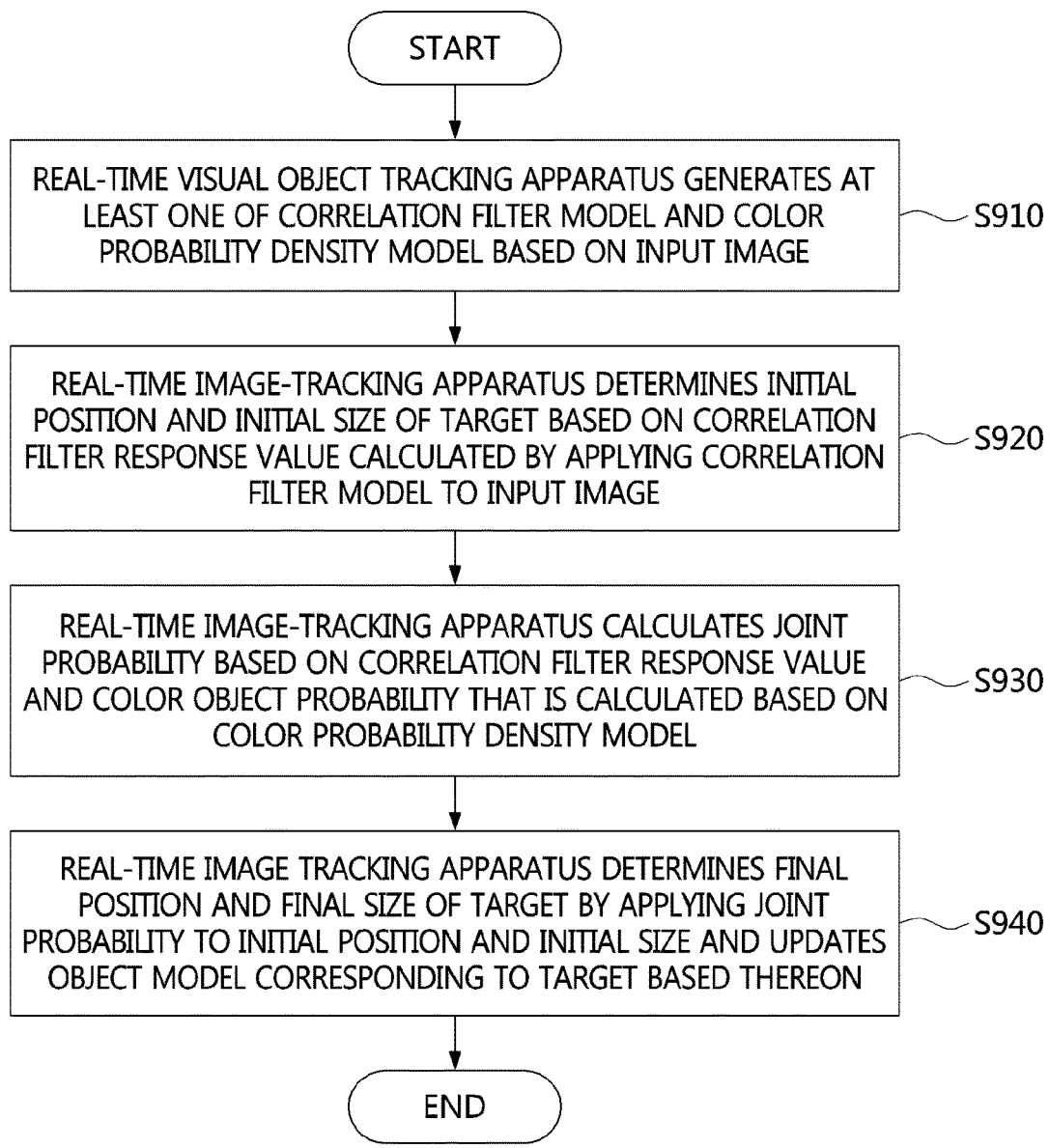
FIG. 9 is a flowchart that shows a method for tracking object in video in real time in consideration of both color and shape according to an embodiment of the present invention.

FIG. 9 is a flowchart that shows a method for tracking object in video in real time in consideration of both color and shape according to an embodiment of the present invention.

Referring to FIG. 9, in the real-time visual object tracking method that considers both color and shape according to an embodiment of the present invention, a real-time visual object tracking apparatus that considers both color and shape generates at least one of a correlation filter model, in which the shape of a target to be tracked is considered, and a color probability density model, in which the color of the target to be tracked is considered, based on an input image at step S910.

Here, the input image may be received through a separate image input module for receiving an image. For example, the image input module may receive an image for which the visual object tracking process is to be performed in real time. Here, the input image may be an image file, a video file, or a camera image signal. However, the format of the input image and the input interface are not limited to specific formats or interfaces.

Here, both the correlation filter model and the color probability density model correspond to an object model for the target to be tracked, and may become an object model for tracking the target.

Here, region information about the target to be tracked is acquired, and at least one of a correlation filter model and a color probability density model may be generated for an object region corresponding to the region information in the entire region of the input image.

Here, the region information may be acquired based on at least one of an object detection module and settings made by a user. For example, a user may input the region information by setting the position, the size, the border, and the like of the target to be tracked on the screen of the input image. Alternatively, the region information for the target to be tracked may be acquired by detecting the target to be tracked in the input image using the object detection module.

Here, when the target to be tracked is first set or when the target to be tracked is reset, at least one of a correlation filter model and a color probability density model may be generated.

Here, the correlation filter model may correspond to a filter that outputs a kernel function as the result of the correlation filter operation performed for the input image. That is, a filter satisfying the condition in which the result of the correlation filter operation performed for the object region is a kernel function may be generated as the correlation filter model.

Here, the kernel function is a function that is symmetric about the origin and outputs a value that is equal to or greater than 0 (a non-negative value) for every input. Also, the integration of the function becomes 1. Gaussian, Epanechnikov, and uniform functions are representative examples of such kernel functions.

That is, the correlation filter model that the present invention intends to generate may be a correlation filter satisfying the condition in which the result of a correlation filter operation performed for the input image is a kernel function that has a peak at the position of a target to be tracked and has values that decrease the farther a position is from the position of the target to be tracked.

For example, if the region for the target to be tracked in the input image is x and if the kernel function is y, the correlation filter $f$ may be calculated as shown in Equation (1):

$$\hat{f} = \frac{\hat{x}^* \bullet y}{\hat{x}^* \bullet \hat{x} + \lambda} \quad (1)$$

where $\hat{x}$ denotes the Discrete Fourier Transform for x, the superscript * denotes a complex-conjugate, $\bullet$ denotes element-wise multiplication, the division is element-wise division, and $\lambda$ denotes a regulation parameter for limiting the norm of the function $f$.

Here, the color probability density model may be a probability density function modeled for the distribution of colors included in the target to be tracked.

Here, the color probability density model may be generated by dividing the value of a color histogram for the object region by the total number of pixels included in the object region. The easiest way to acquire the color probability density from the input image may be the use of a normalized color histogram.

Here, the color histogram may be formed by dividing the ranges of colors into sections and counting pixels corresponding to each section. After a color histogram for image pixels included in the target to be tracked in the input image is acquired, the color probability density may be calculated by dividing the value of the color histogram by the total number of object pixels.

Such a color probability density model may be modeled as a single histogram for the entire object, as in the Mean-Shift method for performing image tracking using color information, or may be modeled as histograms for segmented regions included in the object, as in the Sum-Shift method, but the implementation thereof is not limited to these examples.

Also, in the real-time visual object tracking method that considers both color and shape according to an embodiment of the present invention, the real-time visual object tracking apparatus determines the initial position and the initial size of the target to be tracked at step S920 based on a correlation filter response value that is calculated by applying the correlation filter model to the input image.

Here, a place corresponding to any one pixel having the maximum correlation filter response value, among image pixels, is determined to be the initial position, and the result of multiplying the size of the target to be tracked in the frame preceding the input image by the multiplicative inverse of the scale of the input image, acquired when the correlation filter response value for the input image reaches the maximum, may be determined to be the initial size.

That is, the correlation filter response value may be calculated for each of the image pixels within the input image. For example, if the correlation filter model is $f$ and if the input image is I, the correlation filter response value $R(x, y)$ at the pixel $(x, y)$ may be calculated as shown in Equation (2):

$$R(x,y) = \Sigma_i f(x_i - x, y_i - y) I(x_i, y_i) \quad (2)$$

Here, it is desirable for the initial position of the target to be set to the place at which the correlation filter response value $R(x, y)$ reaches the maximum.

Also, the initial size of the target to be tracked may be set in such a way that, after a correlation filter response value is calculated while changing the scale of the input image, the scale of the input image when the calculated correlation filter response value reaches the maximum is selected, and the product of the multiplicative inverse of the corresponding scale and the size of the target in the frame preceding the input image is set as the initial size of the target to be tracked.

For example, if the correlation filter response value reaches the maximum when the image of the target to be tracked is scaled up 1.1 times and if the size of the target to be tracked in the frame immediately preceding the input image is s, the initial size of the target to be tracked in the current image frame may be set to s/1.1.

Also, in the real-time visual object tracking method that considers both color and shape according to an embodiment of the present invention, the real-time visual object tracking apparatus calculates a joint probability at step S930 based on the correlation filter response value and a color object probability, which is calculated based on the color probability density model.

Here, the joint probability may be acquired by calculating the weighted average of a color object probability and a correlation filter response value for each of the image pixels.

For example, using the current object model corresponding to the target to be tracked, the correlation filter response value calculated for the pixel (x, y) may be assumed to be R(x, y), and the color probability density value calculated for the color of the pixel (x, y) may be assumed to be H(x, y). Here, H(x, y) may represent the color object probability based on the color information of the target to be tracked, and R(x, y) may represent the probability based on information about the shape of an object. The joint probability p(x, y), which is a combination of the two complementary characteristics, may be calculated using various methods, but may be desirably calculated as the weighted average of two probabilities, as shown in Equation (3):

$$p(x,y)=w*H(x,y)+(1-w)*R(x,y) \quad (3)$$

where w is a constant that satisfies $0 \leq w \leq 1$, and is a parameter that may be freely adjusted according to the applications.

Here, the color object probability for each of the image pixels in the input image may be calculated by back-projecting the color probability density model to the input image.

Also, in the real-time visual object tracking method that considers both color and shape according to an embodiment of the present invention, the real-time visual object tracking apparatus determines the final position and the final size of the target to be tracked by applying the joint probability to the initial position and the initial size, and updates the object model corresponding to the target to be tracked based on the final position and the final size at step S940.

Here, based on the initial position, the place at which the probability density of the joint probability reaches the maximum is determined to be the final position, and the initial size may be determined to be the final size.

Here, the position at which the probability density reaches the maximum may be calculated using various methods, and the method is not limited to any specific method.

For example, the place corresponding to the local peak of the joint probability distribution may be found using the Mean-Shift method, or the place at which the local sum of joint probabilities reaches the maximum may be found using the Sum-Shift method. Here, when the place at which the local sum of probabilities reaches the maximum is determined to be the final position, as in the Sum-Shift method, the accuracy of image tracking may be improved more than when using the Mean-Shift method.

Also, the final size of the target to be tracked may be calculated again using the joint probability. However, because it is more desirable to determine the size of the target to be tracked based on the shape information, rather than on the probability acquired from the color information, the initial size, determined based on the correlation filter model, may be used as the final size without change.

Here, the object model may be updated so as to match the weighted average of the previous object model corresponding to the target to be tracked and a new object model created based on the final position and the final size.

That is, after an object model is newly generated from the image region that is selected based on the finally determined position and size of the target to be tracked in the current input image, the object model may be updated using the weighted average of the object model and the previously maintained object model. For example, assuming that the previous object model is $M^{t-1}$ that the newly generated object model is M, and that the updated object model is $M^t$, $M^t$ may be calculated as shown in Equation (4):

$$M^t=(1-\mu)M^{t-1}+\mu M \quad (4)$$

where μ is a parameter for adjusting the model update speed, and may be set to any value between 0 and 1, but generally, it is advantageous to use a small value, for example, about 0.01.

Here, because the object model according to an embodiment of the present invention consists of two models, which are the correlation filter model and the color probability density model, the object model update process using Equation (4) may be performed for each of the correlation filter model and the color probability density model. In this case, the update speed parameter may be set to different values for the respective models.

Also, although not illustrated in FIG. 9, in the real-time visual object tracking method that considers both color and shape according to an embodiment of the present invention, various kinds of information generated during the real-time visual object tracking process according to an embodiment of the present invention are stored.

Also, the real-time visual object tracking method according to an embodiment of the present invention may be implemented in various forms, such as a program executed in a computer, a separate device or a system on chip (SoC), including memory for storing programs and a processor for executing the programs, and the like, but the implementation form is not limited to these examples.

Through the above-described real-time visual object tracking method, high-speed tracking may be implemented even in a low computational power environment, such as an embedded system or the like.

Also, a method that achieves great tracking performance regardless of shading, rotation, and changes in the size and shape of a target to be tracked may be provided, and the performance of tracking an object in an image may be improved by tracking the object using a combination of the color information and the shape information thereof.

Figure 10:
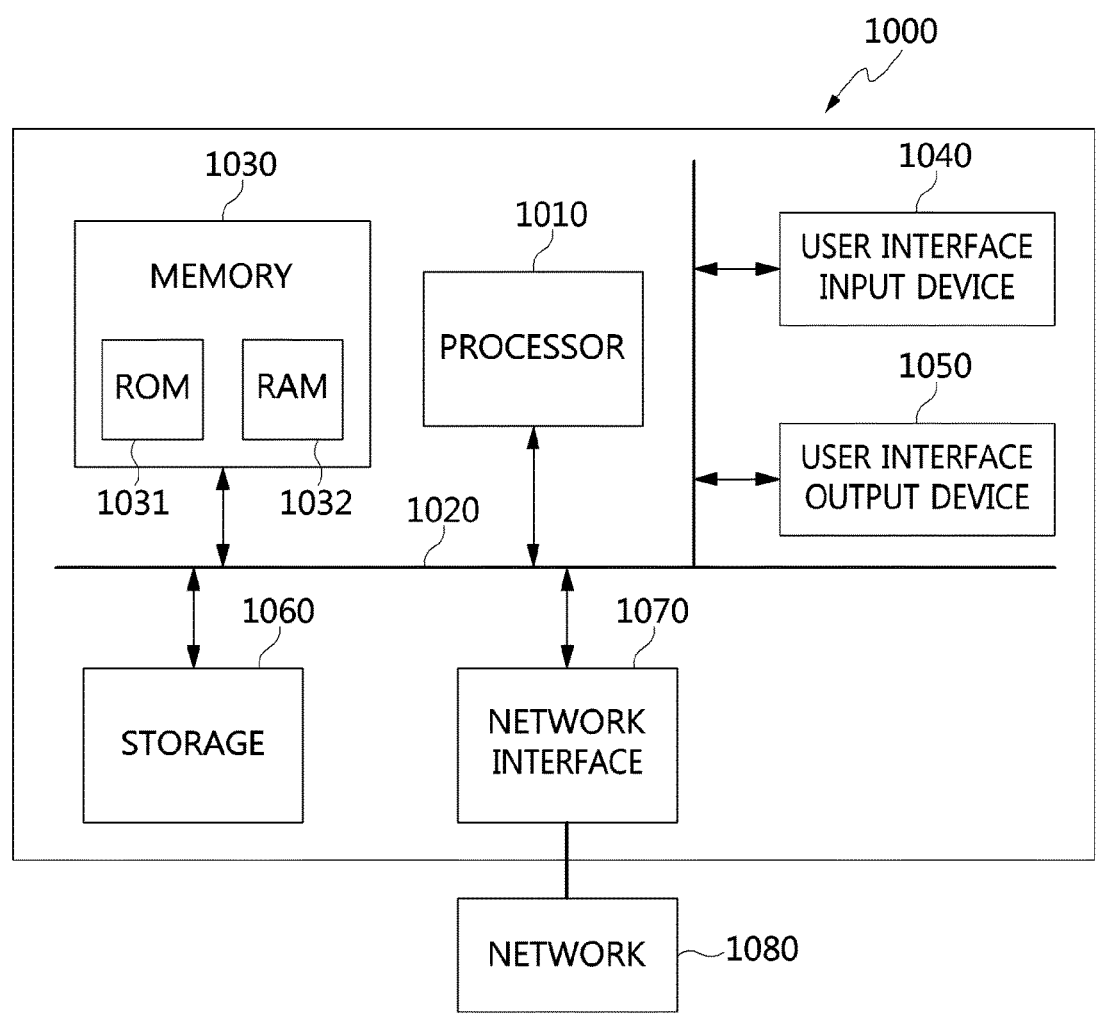
FIG. 10 is a view that shows a computer system according to an embodiment of the present invention.

FIG. 10 is a view that shows a computer system according to an embodiment of the present invention.

Referring to FIG. 10, an embodiment of the present invention may be implemented in a computer system such as a computer-readable recording medium. As illustrated in FIG. 10, the computer system 1000 may include one or more processors 1010, memory 1030, a user interface input device 1040, a user interface output device 1050, and storage 1060, which communicate with each other via a bus 1020. Also, the computer system 1000 may further include a network interface 1070 connected with a network 1080. The processor 1010 may be a central processing unit or a semiconductor device for executing processing instructions stored in the memory 1030 or the storage 1060. The memory 1030 and the storage 1060 may be various types of volatile or non-volatile storage media. For example, the memory may include ROM 1031 or RAM 1032.

Therefore, an embodiment of the present invention may be implemented as a volatile computer-readable medium in which a method implemented through a computer is recorded or in which instructions executable by a computer are recorded. When the computer-readable instructions are executed by a processor, the computer-readable instructions may perform a method according to at least one aspect of the present invention.

According to the present invention, it is possible to implement high-speed tracking even in a low computational power environment, such as an embedded system or the like.

Also, the present invention may provide a method for providing good tracking performance regardless of shading, rotation, and changes in the size and shape of a target to be tracked.

Also, the present invention may track an object by combining the color information and the shape information thereof, which are complementary to each other, thereby improving object-tracking performance in an image.

As described above, the real-time visual object tracking apparatus and method that consider both color and shape according to the present invention are not limitedly applied to the configurations and operations of the above-described embodiments, but all or some of the embodiments may be selectively combined and configured, so that the embodiments may be modified in various ways.

What is claimed is:

1. An apparatus for tracking object in video stream in real time, comprising:
    a generation unit for generating at least one of a correlation filter model, in which a shape of a target to be tracked is considered, and a color probability density model, in which a color distribution of the target to be tracked is considered, based on an input image;
    a determination unit for determining an initial position and an initial size of the target to be tracked based on a correlation filter response value that is calculated by applying the correlation filter model to the input image;
    a calculation unit for calculating a joint probability of the target based on the correlation filter response value and a color object probability that is calculated based on the color probability density model; and
    an update unit for determining a final position and a final size of the target to be tracked by applying the joint probability to the initial position and the initial size and for updating an object model corresponding to the target to be tracked based on the final position and the final size.

2. The apparatus of claim 1, wherein the calculation unit calculates the joint probability by calculating a weighted average of the color object probability and the correlation filter response value for each of the image pixels in the input image.

3. The apparatus of claim 1, wherein the update unit determines a place at which a probability density of the joint probability reaches a maximum to be the final position based on the initial position, and determines the initial size to be the final size.

4. The apparatus of claim 2, wherein the determination unit determines a place corresponding to any one pixel at which the correlation filter response value reaches a maximum, among the image pixels, to be the initial position, and determines a result of multiplying a previous size of the target to be tracked in a frame preceding the input image by a scale of the input image, which is acquired when the correlation filter response value for the input image reaches a maximum, to be the initial size.

5. The apparatus of claim 2, wherein the calculation unit calculates the color object probability for each of the image pixels by back-projecting the color probability density model to the input image.

6. The apparatus of claim 1, wherein the generation unit acquires region information about the target to be tracked and generates at least one of the correlation filter model and the color probability density model for an object region corresponding to the region information in the input image.

7. The apparatus of claim 6, wherein the region information is acquired based on at least one of an object detection module and settings made by a user.

8. The apparatus of claim 1, wherein the generation unit generates at least one of the correlation filter model and the color probability density model in at least one of a case in which the target to be tracked is first set and a case in which the target to be tracked is reset.

9. The apparatus of claim 6, wherein the generation unit generates the correlation filter model such that the result of a correlation filter operation performed for the object region is a kernel function.

10. The apparatus of claim 6, wherein the generation unit generates the color probability density model by dividing a value of a color histogram corresponding to the object region by a total number of pixels included in the object region.

11. The apparatus of claim 1, wherein the update unit updates the object model so as to match a weighted average of a previous object model corresponding to the target to be tracked and a new object model created based on the final position and the final size.

12. A method for tracking object in video in real time, which uses a real-time visual object tracking apparatus that considers both color and shape, comprising:
    generating, by the real-time visual object tracking apparatus, at least one of a correlation filter model, in which a shape of a target to be tracked is considered, and a color probability density model, in which a color distribution of the target to be tracked is considered, based on an input image;
    determining, by the real-time visual object tracking apparatus, an initial position and an initial size of the target to be tracked based on a correlation filter response value that is calculated by applying the correlation filter model to the input image;
    calculating, by the real-time visual object tracking apparatus, a joint probability based on the correlation filter response value and a color object probability that is calculated based on the color probability density model; and
    determining, by the real-time visual object tracking apparatus, a final position and a final size of the target to be tracked by applying the joint probability to the initial position and the initial size, and updating, by the real-time visual object tracking apparatus, an object model corresponding to the target to be tracked based on the final position and the final size.

13. The method of claim 12, wherein calculating the joint probability is configured to calculate the joint probability by calculating a weighted average of the color object probability and the correlation filter response value for each of the image pixels in the input image.

14. The method of claim 12, wherein updating the object model comprises:
    based on the initial position, determining a place at which a probability density of the joint probability reaches a maximum to be the final position; and
    determining the initial size to be the final size.

15. The method of claim 13, wherein determining the final position and the final size comprises:
    determining a place corresponding to any one pixel at which the correlation filter response value reaches a maximum, among the image pixels, to be the initial position; and
    determining a result of multiplying a previous size of the target to be tracked in a frame preceding the input image by a scale of the input image that gives a maximum filter response, to the initial size.

16. The method of claim 13, wherein calculating the joint probability is configured to calculate the color object probability for each of the image pixels by back-projecting the color probability density model to the input image.

17. The method of claim 12, wherein generating at least one of the correlation filter model and the color probability density model is configured to acquire region information corresponding to the target to be tracked and to generate at least one of the correlation filter model and the color probability density model for an object region corresponding to the region information in the input image.

18. The method of claim 17, wherein the region information is acquired based on at least one of an object detection module and settings made by a user.

19. The method of claim 17, wherein generating at least one of the correlation filter model and the color probability density model comprises:
  generating the correlation filter model such that the result of a correlation filter operation performed for the object region is a kernel function as the correlation filter model; and
  generating the color probability density model by dividing a value of a color histogram corresponding to the object region by a total number of pixels included in the object region.

20. The method of claim 12, wherein updating the object model is configured to update the object model so as to match a weighted average of a previous object model corresponding to the target to be tracked and a new object model created based on the final position and the final size.

* * * * *